United States Patent
Tsai

(10) Patent No.: US 9,199,429 B2
(45) Date of Patent: Dec. 1, 2015

(54) TRI-ANGLE HERRINGBONE TAPE FOR COMPOSITE PANELS

(71) Applicant: The Board of Trustees of the Leland Stanford Junior University, Palo Alto, CA (US)

(72) Inventor: Stephen W. Tsai, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 29 days.

(21) Appl. No.: 14/336,466

(22) Filed: Jul. 21, 2014

(65) Prior Publication Data

US 2014/0335300 A1    Nov. 13, 2014

Related U.S. Application Data

(63) Continuation-in-part of application No. 14/146,706, filed on Jan. 2, 2014, now abandoned.

(60) Provisional application No. 61/748,241, filed on Jan. 2, 2013.

(51) Int. Cl.
  *B32B 3/16* (2006.01)
  *B32B 5/26* (2006.01)
  *B32B 5/12* (2006.01)

(52) U.S. Cl.
  CPC ... *B32B 3/16* (2013.01); *B32B 5/12* (2013.01); *B32B 5/26* (2013.01); *B32B 2250/03* (2013.01); *Y10T 428/192* (2015.01)

(58) Field of Classification Search
  CPC ...... B29C 70/386; B29C 70/228; B32B 3/16; B32B 5/26; B32B 5/12
  USPC .................................................... 428/61, 58
  See application file for complete search history.

(56) References Cited

U.S. PATENT DOCUMENTS

| | | |
|---|---|---|
| 3,490,983 A | 1/1970 | Lee |
| 4,622,254 A | 11/1986 | Nishimura et al. |
| 2006/0222837 A1 | 10/2006 | Kismarten |
| 2012/0177872 A1 | 7/2012 | Tsai et al. |

*Primary Examiner* — Alexander Thomas
(74) *Attorney, Agent, or Firm* — Lumen Patent Firm

(57) ABSTRACT

A fiber composite tape has a first two-layer strip having a first top layer with fibers angled at φ and a first bottom layer with fibers angled at 0, a second two-layer strip having a second top (or bottom) layer with fibers angled at −φ and a second bottom (or top) layer with fibers angled at 0, and a paper backing tape affixed to the two two-layer strips and joins them side-by-side at their edges to form a seam.

5 Claims, 6 Drawing Sheets

| 200 [Φ] | 204 [−Φ] |
|---|---|
| 202 [0] | 206 [0] |

| 210 [Φ] | 214 [0] |
|---|---|
| 212 [0] | 216 [−Φ] |

| 220 [Φ] | 224 [0] |
|---|---|
| 222 [0] | 226 [−Φ] |

228

Fig. 4A
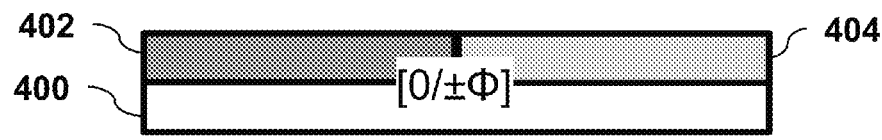
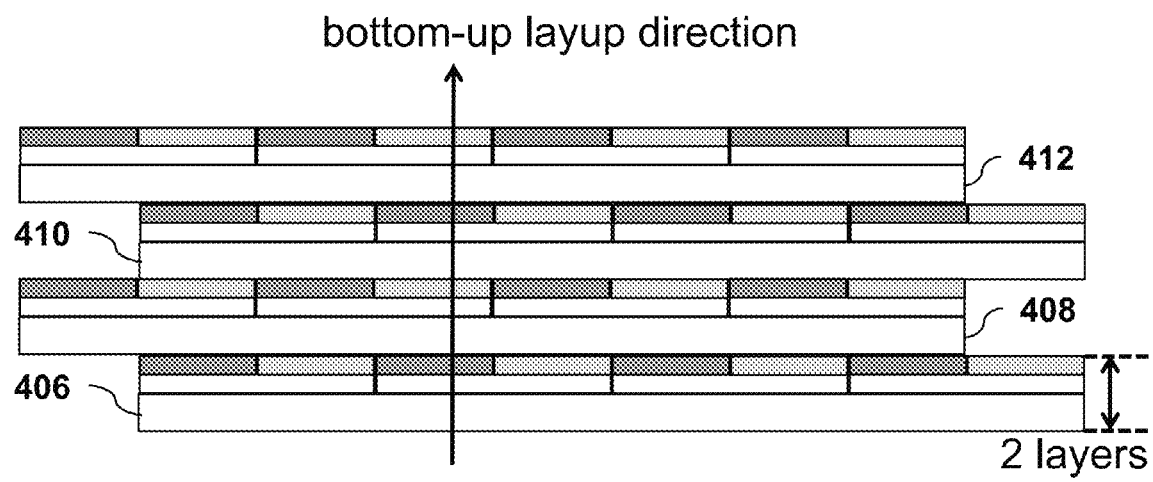
Fig. 4B

*Fig. 5A*
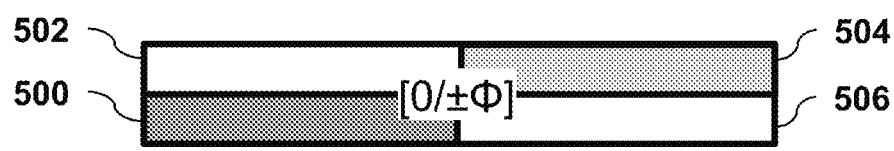
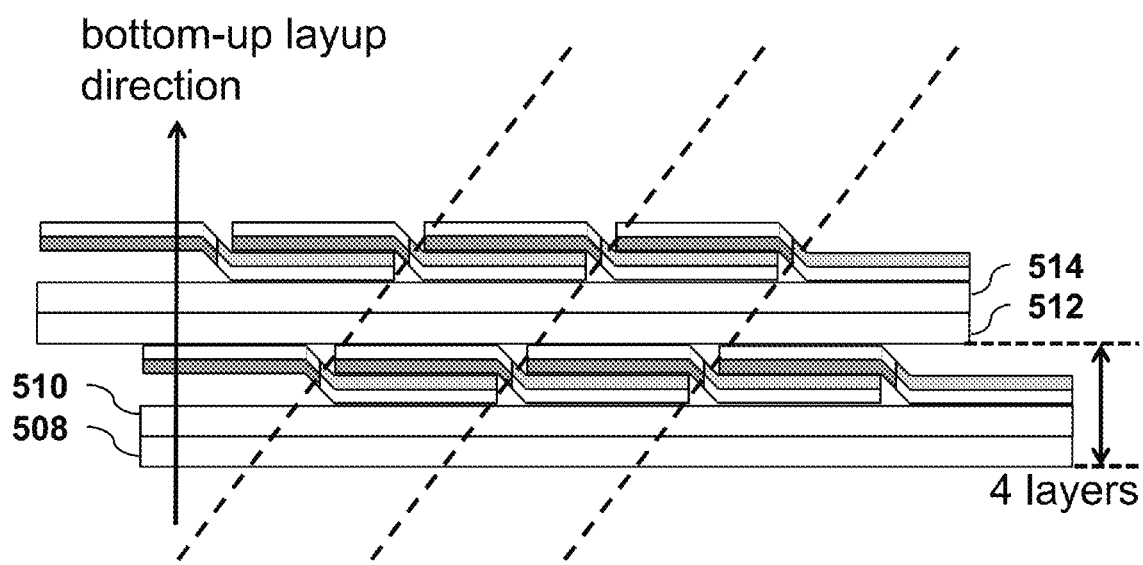
*Fig. 5B*

TRI-ANGLE HERRINGBONE TAPE FOR COMPOSITE PANELS

CROSS-REFERENCE TO RELATED APPLICATIONS

This application is a continuation-in-part of U.S. patent application Ser. No. 14/146,706 filed Jan. 2, 2014, abandoned, which claims priority from U.S. Provisional Patent Application 61/748,241 filed Jan. 2, 2013, both of which are incorporated herein by reference.

FIELD OF THE INVENTION

The present invention relates generally to composite materials. More specifically, it relates to tape assembly and layup methods and resulting laminate composite materials.

BACKGROUND OF THE INVENTION

Conventional tape layup methods and resulting laminated composite materials have important applications to industrial manufacturing of various articles and structures. For example, US Patent Application Publication US 2012/0177872, which is incorporated herein by reference, discloses state-of-the-art composite laminated structures and methods for manufacturing and using the same.

Traditional laminates are built up by uni-tape (i.e., tape with unidirectional fiber orientation) following 4-axis layup, one each along 0, ±45, and 90 degree directions. Since each layer is built up with uni-tape, each layer has parallel tape placed side-by-side with no cut fibers. Automated tape laying (ATL) machine normally uses 6" or 12" wide tape of unidirectional composites. If a laminate design calls for 4 ply angles, like 0°, +45°, −45°, 90°, the tape laying will need to follow 4 different axes, one for each ply orientation, and repeat the layup as required. With bi-axial C-Ply such as [0/45] that is normally made with one half the thickness of uni-tape, 2-axis layup will form the same [π/4] quasi-isotropic laminate, simplifying the layup process. Most ATL made today can handle only one type of tape at a time. Thus, 2-axis layup processes that require two distinctive types of tapes are problematic.

SUMMARY OF THE INVENTION

According to one aspect, the present invention provides a new composite tape, called a tri-axial herringbone tape due to its appearance similar to woolen herringbone. The tri-axial herringbone tape is a two-layer, tri-axial composite tape having 0° degree fibers plus two off-axis angled fibers. The herringbone tape may be made by joining two two-layer bi-axial tapes side-by-side lengthwise to form a single two-layer tri-axial tape, held together with a paper backing For example, two 3" or 6" wide tapes may be joined to form a single 6" or 12" wide tape, respectively. The off-axis fiber angles of the two halves are preferably opposite in sign, e.g., +45° and −45°, but could more generally be any two distinct non-zero angles. The tri-axial tape may be used as the tape in ATL processes, providing increased layups speed and productivity with increased structural performance with a very small additional cost in tape assembly compared with bi-axial tape.

In one aspect, the invention provides a fiber composite tape having a first two-layer strip and a second two-layer strip joined side-by-side at their edges to form a seam and affixed to a paper backing tape that holds the two strips side-by-side. The first two-layer strip has a first layer with fibers angled at φ degrees affixed to a second layer with fibers angled at 0 degrees. The second two-layer strip has a third layer with fibers angled at −φ degrees affixed to a fourth layer with fibers angled at 0 degrees.

In one embodiment, the second and fourth layers (both having fibers angled at 0 degrees) are both bottom layers and the first and third layers (having fibers angled at φ degrees and −φ degrees, respectively) are both top layers. In another embodiment, the second and fourth layers (both having fibers angled at 0 degrees) are top and bottom layers, respectively, and the first and third layers (having fibers angled at φ degrees and −φ degrees, respectively) are top and bottom layers, respectively.

BRIEF DESCRIPTION OF THE DRAWINGS

FIG. 2A is a cross-sectional schematic representation of the composite tri-axial herringbone tape according to an embodiment of the invention.

FIG. 2B is a cross-sectional schematic representation of a composite tri-axial herringbone tape according to another embodiment of the invention.

FIG. 2C is a cross-sectional schematic representation of a composite tri-axial herringbone tape according to another embodiment of the invention.

FIG. 4A shows a cross-sectional schematic view of a tri-axial tape, similar to the embodiment shown in FIG. 2A.

FIG. 4B is a cross-sectional view showing one stacking sequence using the tri-axial tape of FIG. 4A in an two-axis ATL process.

FIG. 5A shows a cross-sectional schematic view of a tri-axial tape, similar to the embodiment shown in FIG. 2B.

FIG. 5B is a cross-sectional view showing one stacking sequence using the tri-axial tape of FIG. 5A in an two-axis ATL process.

DETAILED DESCRIPTION

Figure 1A:
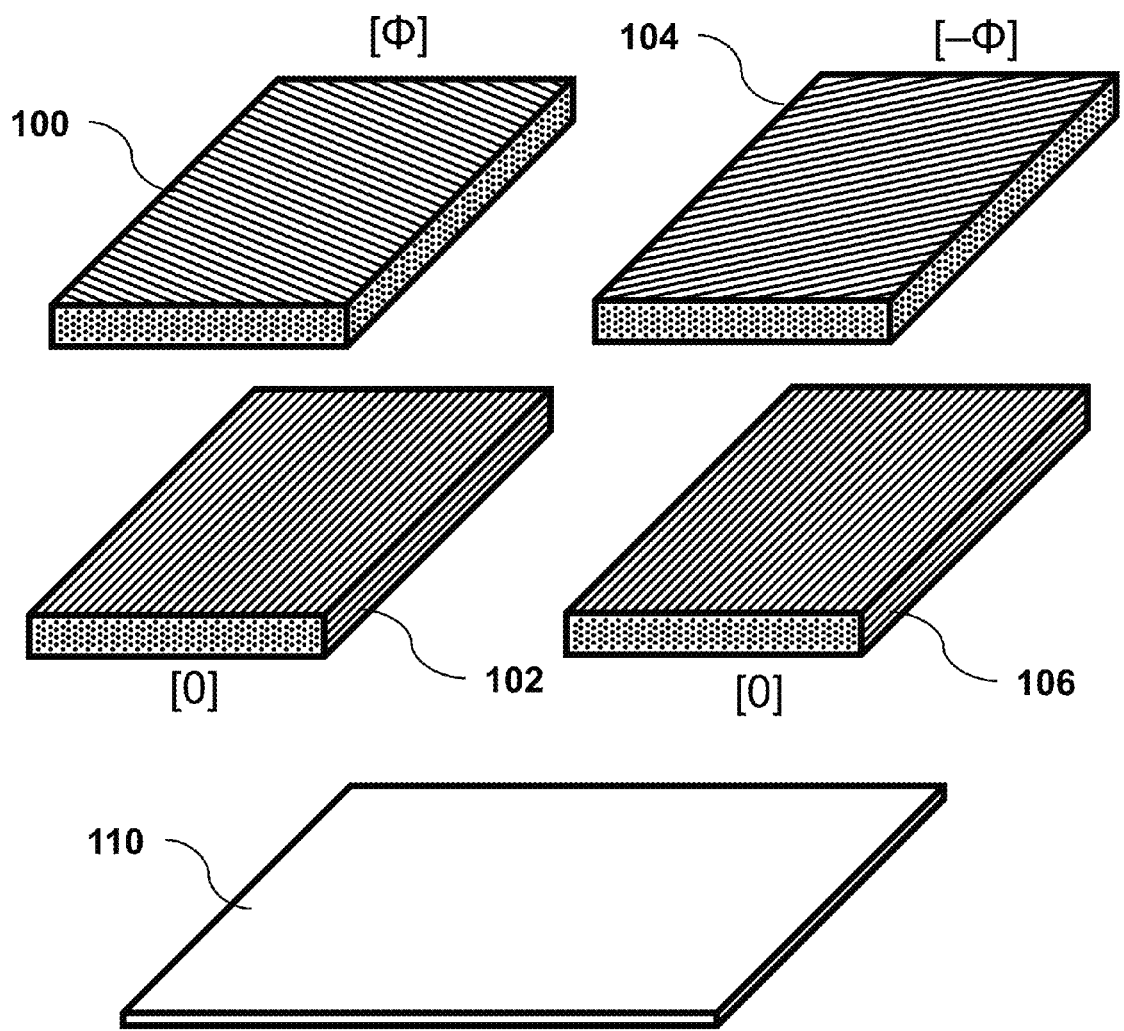
FIG. 1A is a perspective view of separated component layers of a composite tri-axial herringbone tape according to an embodiment of the invention.
Figure 1B:
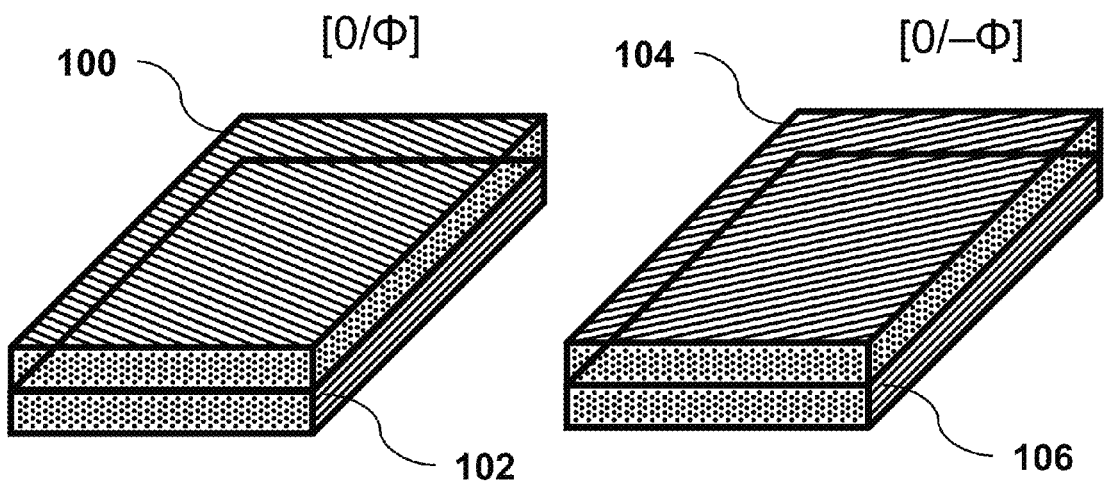
FIG. 1B is a perspective view of two two-layer, bi-axial tapes used to form a composite tri-axial herringbone tape according to an embodiment of the invention.
Figure 1C:
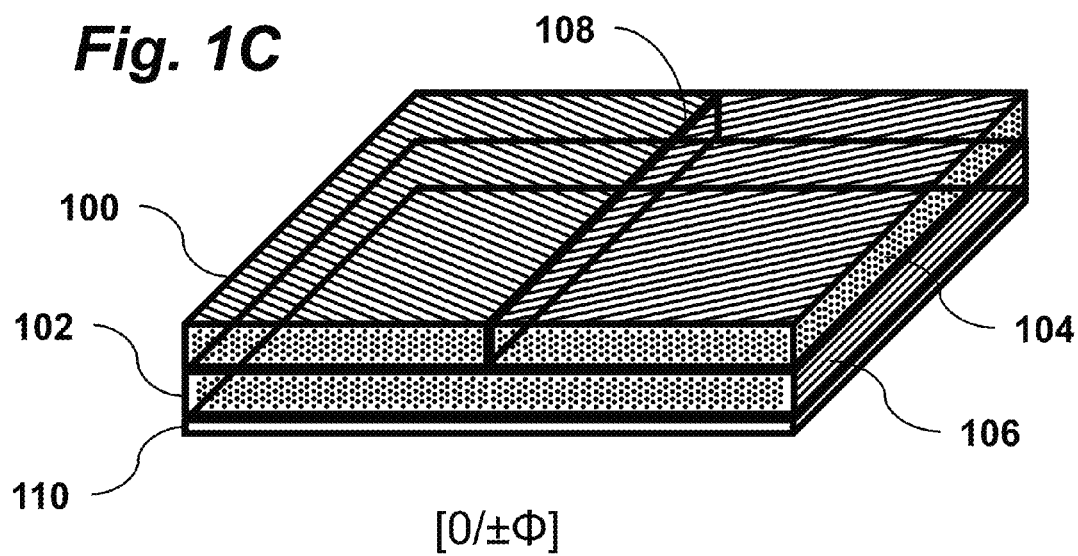
FIG. 1C is a perspective view of a composite tri-axial herringbone tape according to an embodiment of the invention.

FIG. 1A shows separated component layers of a composite tape according to an embodiment of the invention. Layers 100 and 102, each composed of a glass or carbon fibers in a matrix, are affixed to each other to form a single two-layer, bi-axial tape having fiber orientations of angles φ degrees and 0 degrees. All fiber angles are relative to the longitudinal axis of the tape. Similarly, layers 104 and 106 are affixed to each other to form a single two-layer tape with fiber angles of −φ degrees and 0 degrees. These resulting two two-layer, bi-axial tapes, [0/φ], and [0/−φ], are shown in FIG. 1B. These bi-axial tapes may be custom manufactured from uni-tape, or they may be purchased certified tape product. As shown in FIG. 1C, the two two-layer, bi-axial tapes [0/φ] and [0/−φ] are positioned side-by-side lengthwise and joined at their edges forming a seam 108. Because the fibers in the [0] layer are not cut, the seam 108 exists between the [φ] and [−φ] layers 100 and 104, but not between the two adjoining [0] layers 102 and 106. The layers are affixed to a paper backing tape 110 that holds the two strips side-by-side in place. The result is a single two-layer tri-axial [0/±φ] tape ready for use in an ATL process. (Here, the paper backing layer 110 is not counted as one of the two fiber layers of the tape.)

The two bi-axial tapes may be stitched together in a non crimp fabric. Alternatively, the two bi-axial tapes may be already certified prepreg material pressed together by the natural tackiness of prepreg. This latter process has one superior advantage due to the absence of stitching material which is often viewed as a "foreign material" or impurity in the usual two-phase material of fiber and matrix. In the case of non crimp fabric, fibers are kept straight. The high stiffness and strength of composites are maintained. Fiber wash (not maintaining its parallel direction), and ply wrinkles are reduced. Having thinner plies, the multi-layer panel can be homogenized quicker than the case of having thicker plies. With herringbone tape, single-axis layup is suitable for one-dimensional bodies, such as beam-like structures like rotor blade, stringer and wings, and 2-axis layup is suitable for two-dimensional structures, such as square and rectangular panels, pipes, vessels, and fuselage.

Although the embodiment of FIG. 1A-C shows the case where the off-angle orientations ±φ are equal in magnitude, in general the off-angle orientation angles may be different. Such a tape has three ply angles: 0°, α, β, where α, β are non-zero and |α|≠|β|, and preferably α, β have opposite signs. In this embodiment, the 0° layer covers the full width of the tape with no seam. Having 0° layer facilitates taking tensile load applied along the 0° direction 1) during resin impregnation to the dry fabric as the tape is pulled through the prepreg machine, 2) when tensile load is applied to the prepreg during the automated tape laying operation, and/or 3) to provide high load carrying capability of laminated composite panels and structures. When two bi-axial tapes of [0/α] and [0/β] are placed side-by-side, a full width 0° layer is automatically provided to share the full width of 6" or 12". For example, the width of the two bi-axial tapes may be 3" or 6", which is one half of the conventional tape width of 6" or 12", respectively. The total thickness of the tri-axial tape is preferably the same as the conventional tape, in order to facilitate ATL.

A cross-sectional schematic representation of the tape of FIG. 1C is shown in FIG. 2A. Layers 200 and 202 form the first two-layer, bi-axial tape [0/φ]. Layers 204 and 206 form the second two-layer, bi-axial tape [0/−φ]. Paper backing 208 joins the two bi-axial tapes together to form a single tri-axial [0/±φ] tape. Note that the 0-degree layers 202 and 206 are both bottom layers, while the ±φ layers 200 and 204 are both top layers. Layers 202 and 206 have parallel [0] fibers, so there are no cut fibers and no seam exists.

Figure 3:
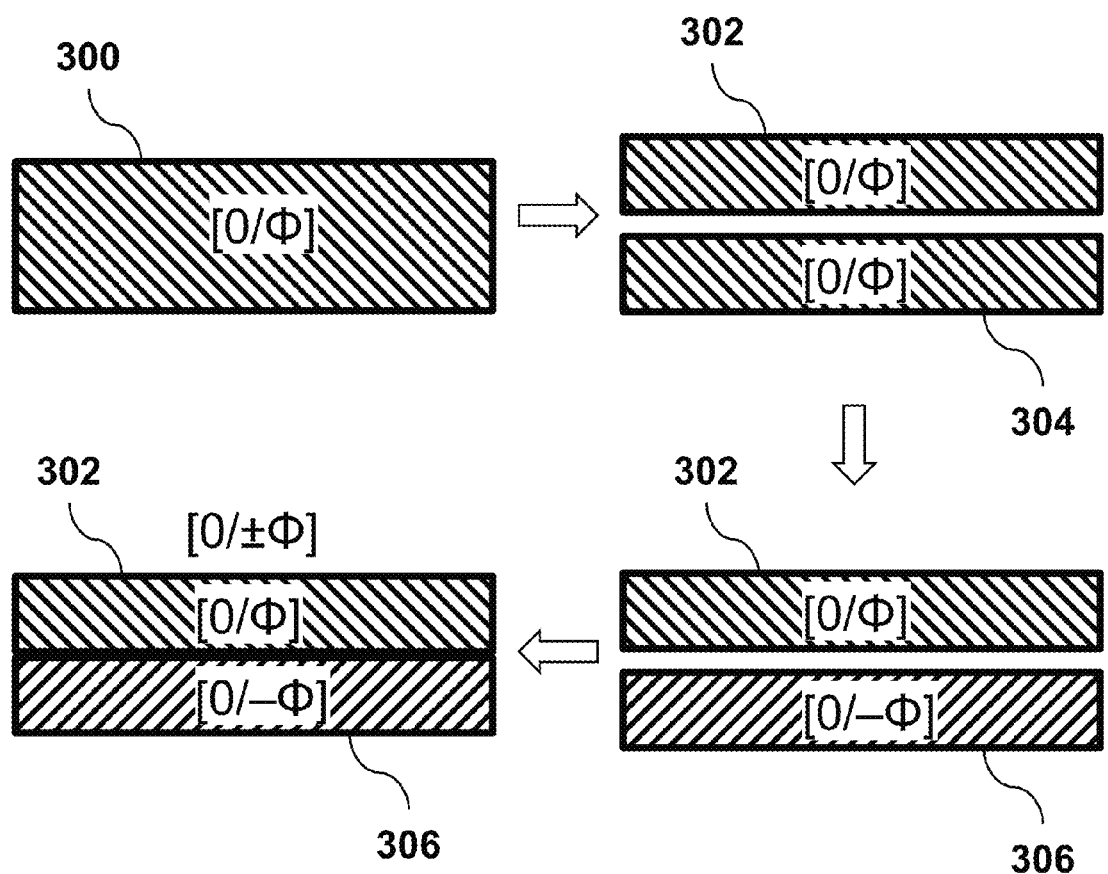
FIG. 3 illustrates a process of forming a composite tri-axial herringbone tape from a single bi-axial tape, according to an embodiment of the invention.

In an alternate embodiment, shown in FIG. 2B, the 0-degree layers 212 and 214 are bottom and top layers, respectively, while the ±φ layers 210 and 216 are top and bottom layers, respectively. The two bi-axial tapes are joined by paper backing 218 to form a single tri-axial [0/±φ] tape. This embodiment has the advantage that one of the two bi-axial tapes can be obtained by flipping over the other. Thus, only one type of bi-axial tape is needed to manufacture this tri-axial tape. This process is illustrated in FIG. 3, which shows a top view of a strip of bi-axial tape 300 which is cut lengthwise into two strips 302 and 304. Strip 306 is flipped over along its longitudinal axis to yield strip 306, reversing the orientation of the off-angle threads. (For clarity of illustration, the figures show only the off-angle thread orientations.) The two strips 302 and 306 are then joined to form a single tri-axial tape having the same width as the original tape 300.

With the herringbone tape of the present invention, we have the option of using one bi-axial tape will suffice. When a 0° and 30° tape is flipped over, it becomes a −30° and 0° tape. So when two of the same tape are place side-by-side, with one with 0° placed on the bottom, and the adjacent tape that is flipped will have 0° tape on top. Thus a herringbone tape with two 0° and ±30° is created from one 0° and 30° tape.

FIG. 2C illustrates another embodiment in which the 0-degree layer in each bi-axial tape is thinner than its off-axis layer. In particular bi-axial tape [0/φ] is made of thick layer 220 and thin layer 222. This type of bi-axial tape can be flipped and used to form second bi-axial tape [0/−φ] having thick layer 226 and thin layer 224. The two bi-axial tapes are joined by paper backing 228 to form a single tri-axial [0/±φ] tape. This embodiment has the advantage that there is a vertical off-set between the layers of the adjacent bi-axial tapes, increasing structural performance.

This embodiment illustrates that each ply within the bi-axial tape can have different thickness. In addition, or alternatively, each ply could be made of a different material, such as a carbon and glass, creating a carbon-glass hybrid. In addition, various off-angle magnitudes may be used, including shallow angles like 20 to 30 degrees, and large angles between 45 to 70. The width of the tri-axial herringbone tape may be other than 6" and 12", although these are preferred for use with standard ATL. The herringbone tape can be used also without ATL. In this case, wider goods than 12" would be available. Thus the number of seams can be reduced significantly if not eliminated all together.

FIG. 4A shows a cross-sectional view of a tri-axial [0/±φ] tape with top φ layer 402, top−φ layer 404, and bottom 0-degree layer 400, corresponding to the embodiment shown in FIG. 2A. FIG. 4B is a cross-sectional view showing one stacking sequence using the tri-axial tape of FIG. 4A in an ATL process. The figure shows four pairs of layers. The bottom pair has four adjacent strips of tri-axial tape laid up on top of a similar layer 406 stacked in orthogonal or perpendicular direction. The pairs of layers continue to to be stacked, with four strips stacked side-by-side on each of layers 406, 408, 410, 412, where the strips are staggered like bricks, with an offset of half the tape width. The layup with ratio in this stacking sequence is 1:1, i.e., the same number in the x- and y-axis directions, stacked alternatively. This stacking sequence provides uniform ±φ distribution across the thickness of the laminate.

This unique stacking sequence will provide 0° and/or 90° on the top and bottom outer surfaces. This is done with the same herringbone tape, and is not possible to do with conventional tapes which would need two different types of tape, one with the 0° ply on the bottom of the tape, and the other with 0° ply on the top of the tape. It is not an easy task for ATL to have access to two tapes. The advantages of this stacking are its simplicity, and each building block has two layers of tri-axial tape. There is, however, local variation of off-axis plies, and the [+φ] and [−φ] strips are not placed in a homogenized pattern in the thickness directions.

FIG. 5A shows a cross-sectional view of a tri-axial [0/±φ] tape with top φ layer 504, bottom −φ layer 500, and 0-degree layers 502, 506, similar to the embodiment shown in FIG. 2B, which may be created from two identical bi-axial tapes by flipping one and joining them. FIG. 5B is a cross-sectional view showing a stacking sequence using the tri-axial tape of FIG. 5A in an ATL process. The figure shows a two groups of four-layers each. The bottom four-layer group has four strips of tri-axial tape laid up in an over-lapping fashion, with half the width of one strip on top of the adjacent strip. This over-lapping double-layer is laid up on top of double layers 508, 510 of the tri-axial tape laid up in a similar fashion, but in alternatively orthogonal or perpendicular direction. The layers continue to to be stacked similarly with another four-layer group made of layers 512, 514 orthogonal or perpendicular to overlapping strips, where the four-layer groups are laid up with predetermined stagger. Note that, in contrast to the embodiment of FIG. 4B, the entire assembly shown in FIG. 5B is homogenized along the thickness direction.

For example, using a 6" wide tri-axial [0/±45] tape, succeeding tapes are laid with 3" overlap, repeating to the desired width of a composite panel. A single type of herringbone tape with overlapping in this way will make a double layer with ply orientations from bottom up 0°/+45°/−45°/0°. With this process, both the bottom and top surfaces of the panel will have all 0° with parallel seams spaced at 3" intervals. Such seams have insignificant effect on the load-carrying capability of 0°. Another important feature of this 50 percent overlap is that the laminate thickness will remain the same. If overlap is more or less than 50 percent of the width of the tape, there will be bumps in the laminate. Conventional tri-ax cannot provide 0° finish on top or bottom surface unless the tape is flipped during the layup process. Flipping during layup is very labor intensive particularly when there are ply drops to achieve a tapered panel. It is valuable to have 0° finish on the outer surfaces, as it provides high strength and effective load transfer from the forces at the end of the panel. Another advantage is that staggering provides natural tapering at the edges of the structure.

Herringbone tape may also be used in helical tape winding for pipes, vessels, bulkheads and fuselage. Herringbone tape can also be designed for 1-axis layup. That could be an all-hoop winding for pipes or vessels.

Applications of the present invention include aircraft and spacecraft manufacturing, manufacturing of sporting goods such as bicycle, tennis racket, golf shaft, fishing rod, pole vault; and truck and bus manufacturing.

Surprisingly, the composite tape of the present invention provides the advantages of tri-axial tape with just two layers. In many structural applications 0° plus two off-axis ply angles are required.

With the herringbone tape of the present invention, 1-axis layup is possible for an entire structure, such as a composite panel. Depending on the length-to-width ratio of the finished panel, the layup speed can be an order of magnitude over the conventional 4-axis layup. Faster speed means less labor and higher productivity. For 2-axis layup, the herringbone tape can offer 6-ply panels that have been tested to have 40 percent increase in compressive strength after impact (CAI) over the conventional 4-ply panel. Other design options can be very helpful to achieve structural efficiency not possible with conventional 4-axis design.

One of the serious problems of composites is the ability to design and manufacture panels that will be high quality, optimally designed, and ease of fabrication. Embodiments of the present invention can increase quality because the 1- and 2-axis layups are conceptually simple and less prone to error. It allows for a wide selections of materials, ply thickness, ply angles, and high degree of homogenization so the optimum combinations can be achieved in a much straightforward path than current practices. Fabrication by ATL or even by hand can ensure reliable results because the herringbone tape is a highly engineered product that will deliver the desired intrinsic properties of composites. With simultaneous weight and cost reduction, industry would embrace this new approach to designing and building composites panel.

Herringbone allows substantial time savings in the layup process, reduces directly the direct labor cost, increases production rate, and improves productivity of ATL machine. Herringbone delivers exceptional strength while providing significant savings in ATL processing time. Thus it reduces cost and weight simultaneously.

The invention claimed is:

1. A tri-axial, two-layer fiber composite tape having a first two-layer strip and a second two-layer strip joined side-by-side lengthwise at their edges to form a seam and affixed to a paper backing tape that holds the two strips side-by-side;
   wherein the first two-layer strip has a first layer with fibers angled at $\alpha$ degrees affixed to a second layer with fibers angled at 0 degrees;
   wherein the second two-layer strip has a third layer with fibers angled at $\beta$ degrees affixed to a fourth layer with fibers angled at 0 degrees;
   where $\alpha$, $\beta$ are non-zero, $|\alpha| \neq |\beta|$, and $\alpha$, $\beta$ have opposite signs.

2. The fiber composite tape of claim 1 wherein the second and fourth layers are both bottom layers and the first and third layers are both top layers.

3. The fiber composite tape of claim 1 wherein the second and fourth layers are top and bottom layers, respectively, and the first and third layers are top and bottom layers, respectively.

4. The fiber composite tape of claim 1 wherein $\alpha = \phi$ and $\beta = -\phi$ for a non-zero angle $\phi$.

5. The fiber composite tape of claim 4 wherein $\phi$ is in the range 20 to 70 degrees.

* * * * *